United States Patent
Hellwig et al.

(10) Patent No.: US 8,671,341 B1
(45) Date of Patent: Mar. 11, 2014

(54) SYSTEMS AND METHODS FOR IDENTIFYING CLAIMS ASSOCIATED WITH ELECTRONIC TEXT

(75) Inventors: John Hellwig, Penn Valley, CA (US); John M. Pierre, Pacifica, CA (US); Mark H. Butler, Moraga, CA (US)

(73) Assignee: Linguastat, Inc., Pacifica, CA (US)

( * ) Notice: Subject to any disclaimer, the term of this patent is extended or adjusted under 35 U.S.C. 154(b) by 1304 days.

(21) Appl. No.: 12/006,716

(22) Filed: Jan. 4, 2008

Related U.S. Application Data (60) Provisional application No. 60/878,880, filed on Jan. 5, 2007.

(51) Int. Cl.
*G06F 17/00* (2006.01)

(52) U.S. Cl.
USPC ............... 715/254; 715/255; 715/256; 704/4; 704/9

(58) Field of Classification Search
USPC ........... 715/255, 256, 259, 254; 704/9, 251, 4
See application file for complete search history.

(56) References Cited

U.S. PATENT DOCUMENTS

| | | | |
|---|---|---|---|
| 5,970,449 A | 10/1999 | Alleva et al. | |
| 6,366,908 B1 * | 4/2002 | Chong et al. | 1/1 |
| 7,139,752 B2 * | 11/2006 | Broder et al. | 1/1 |
| 7,668,791 B2 * | 2/2010 | Azzam et al. | 706/45 |
| 7,853,445 B2 * | 12/2010 | Bachenko et al. | 704/9 |
| 7,908,274 B2 * | 3/2011 | Zartler et al. | 707/736 |
| 7,917,493 B2 * | 3/2011 | Vailaya et al. | 707/711 |
| 7,962,324 B2 * | 6/2011 | Faisman et al. | 704/8 |
| 2004/0001099 A1 * | 1/2004 | Reynar et al. | 345/776 |
| 2004/0236730 A1 | 11/2004 | Frank | |
| 2006/0041424 A1 * | 2/2006 | Todhunter et al. | 704/9 |
| 2006/0112110 A1 | 5/2006 | Maymir-Ducharme et al. | |
| 2006/0167689 A1 | 7/2006 | Maren | |
| 2007/0010993 A1 * | 1/2007 | Bachenko et al. | 704/9 |
| 2008/0033715 A1 | 2/2008 | Barklund et al. | |
| 2008/0126080 A1 | 5/2008 | Saldanha et al. | |
| 2008/0235018 A1 * | 9/2008 | Eggen et al. | 704/251 |
| 2008/0294637 A1 * | 11/2008 | Liu | 707/6 |
| 2008/0319735 A1 * | 12/2008 | Kambhatla et al. | 704/9 |
| 2009/0049021 A1 | 2/2009 | Chitrapura et al. | |
| 2009/0198654 A1 * | 8/2009 | Surendran et al. | 707/3 |
| 2009/0287476 A1 | 11/2009 | Johnson et al. | |
| 2010/0324991 A1 * | 12/2010 | Colledge et al. | 705/14.49 |

OTHER PUBLICATIONS

Rion Snow, 'Learning Syntactic pattern for automatic hypernym discovery', published 2004, Stanford.edu, pp. 1-8.*

Soon, Wee Meng, et al., "A Machine Learning Approach to Coreference Resolution of Noun Phrases", Association for Computational Linguistics, vol. 27, No. 4, 2001, pp. 521-544.

* cited by examiner

*Primary Examiner* — Stephen Hong
*Assistant Examiner* — Matthew Ludwig
(74) *Attorney, Agent, or Firm* — Hickman Palermo Truong Becker Bingham Wong LLP (57) ABSTRACT

A system, method, and computer program for identifying claims associated with electronic text are provided. Electronic text is accessed. Linguistic content associated with the electronic text is identified. A linguistic structure is generated based on the linguistic content identified. The linguistic structure is compared to a claim template. A claim is identified based on the comparison.

35 Claims, 7 Drawing Sheets

| Example Text | Example Linguistic Structure | Example Structured Template for an Ability Claim | Structure/Template Match | Representation of identified Claim(s) |
|---|---|---|---|---|
| "Doctors treat cancer with surgery." | Subject Slot: doctor (PERSON); Predicate Slot: treat (CHANGE VERB); Object Slot: cancer (DISEASE) | Subject Slot: = PRODUCT OR INGREDIENT; Predicate Slot: = CHANGE VERB; Object Slot: = DISEASE | NO | |
| "Cancer can also be treated by drinking Goji juice." | Subject Slot: drinking Goji juice (INGREDIENT); Predicate Slot: treat (CHANGE VERB); Object Slot: cancer (DISEASE) | | YES | Product/Ingredient: Goji juice; Change Verb: treats; Disease: cancer |
| "LifeElixir can actually shrink tumor cells." | Subject Slot: LifeElixir (PRODUCT); Predicate Slot: shrink (CHANGE VERB); Object Slot: tumor cells (DISEASE) | | YES | Product/Ingredient: LifeElixir; Change Verb: shrinks; Disease: tumor cells |

SYSTEMS AND METHODS FOR IDENTIFYING CLAIMS ASSOCIATED WITH ELECTRONIC TEXT

CROSS-REFERENCE TO RELATED APPLICATIONS

The present application claims the priority benefit of U.S. Patent Application No. 60/878,880, filed Jan. 5, 2007, titled, "Apparatus, System and Method for Automated Monitoring of Product and Marketing Claims," which is hereby incorporated by reference.

BACKGROUND

1. Field of the Invention

The present invention relates generally to natural language processing, and more particularly to systems and methods for identifying claims associated with electronic text.

2. Background Art

Conventionally, natural language processing systems may be utilized to process electronic text. Natural language processing may identify, for example, various file formats, character encoding schemes, parts-of-speech tagging, syntactic parsing, and so forth. Reasons for processing the electronic text range from storing and retrieving information to evaluating the electronic text to create and manage taxonomies.

Vast numbers of claims are made every year by numerous organizations, companies and individuals. For example, millions of product and service claims are made every year by many thousands of companies marketing through various communications channels. Governments, agencies and politicians regularly communicate claims to the general public and voters. Increasingly, marketing, advertising, communications and messaging is conducted through electronic channels, including traditional channels such as television and radio, and emerging electronic channels, such as the Internet, as well as cell phones and other handheld or wireless communications devices.

Claims of various kinds are of interest to millions of shoppers, marketing and purchasing professionals, public relations and communications professionals, business and political strategists, various organizations, the general public, and regulators, such as the FTC, FDA and SEC. For example, product and service claims may be used by shoppers to find suitable products and make buying decisions, by marketers to assess competitive offerings and position product offerings, by purchasing agents to support purchasing decisions and contracts, and by regulators to find and stop deceptive advertising and marketing practices. Political claims may be used by political strategists and candidates to characterize opponents and stake out positions on issues. Other kinds of claims are useful to various audiences.

Claims may be located and analyzed via manual review or search engines. Unfortunately, manual review and analysis of the electronic text is typically time consuming and inconsistent, and search engines often produce voluminous results.

SUMMARY OF THE INVENTION

A system, method, and computer program for identifying claims associated with electronic text are provided. Electronic text is accessed. Linguistic content associated with the electronic text is identified. A linguistic structure is generated based on the linguistic content identified. The linguistic structure is compared to a claim template. A claim is identified based on the comparison.

DESCRIPTION OF EXEMPLARY EMBODIMENTS

Figure 1:
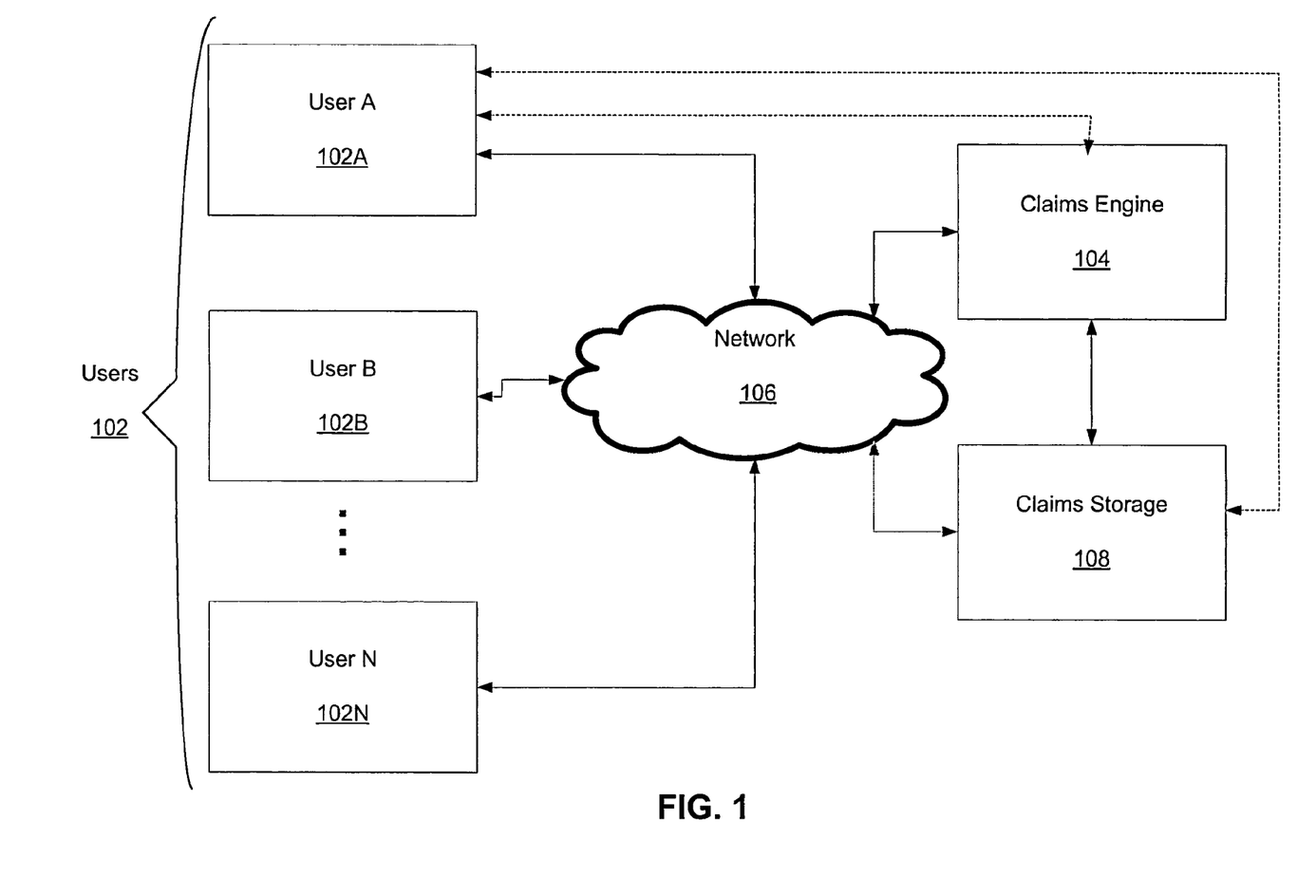
FIG. 1 is a diagram of an exemplary environment for identifying claims.

Referring now to FIG. 1, an exemplary environment for identifying claims is shown. One or more users 102, such as user A 102A, user B 102B, through user N 102N, may communicate with a claims engine 104 directly or via a network 106.

Figure 2:
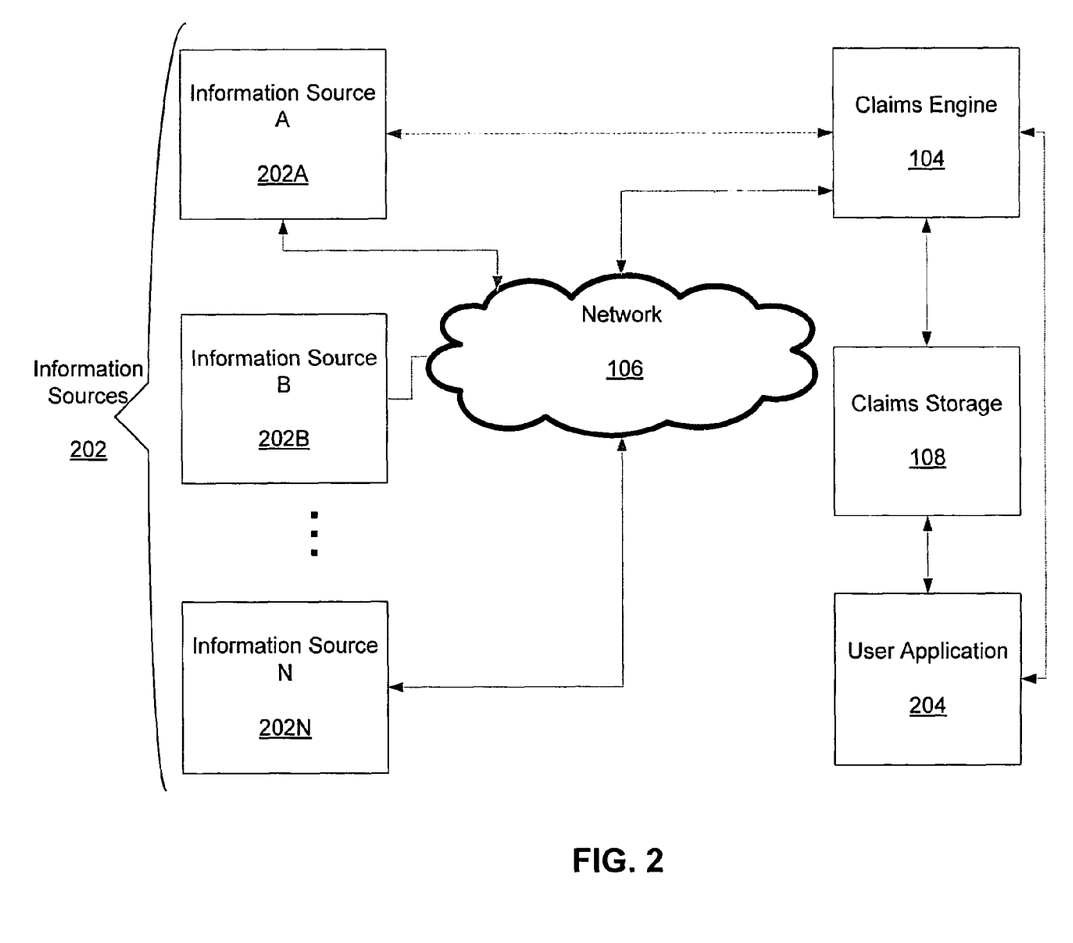
FIG. 2 is a diagram of an exemplary environment for utilizing identified claims to support user applications.

The claims engine 104 accesses various electronic text via the network 106 or otherwise, and ultimately identifies claims from the electronic text (sources of electronic text are discussed further in connection with FIG. 2). The claims may comprise any type of statement or message intended to impart information to, or influence, recipients of the statement or message. Such recipients may include potential buyers or other participants in a marketplace. For example, the statement "Gogi juice cures cancer" in electronic media may comprise a consumer-targeted product claim. The statement "John McCain supports immigration reform" in an advertisement may comprise a political claim targeted to voters. Many other kinds of claims exist.

Within product and service claims, many variants exist, including but not limited to: performance claims, energy efficiency claims, financial claims, and environmental or "green" claims, i.e. claims that a product or service is made and acts in a neutral or positive manner with respect to the earth and natural systems. Some claims have legal meanings and significance. For example, specific types of claims may comprise "health benefit claims", i.e. claims to treat, cure, mitigate, prevent or diagnose disease; "structure/function claims", i.e. claims to maintain normal function of the body; "safety claims", i.e. claims that a product or service are safe to use; "efficacy claims", i.e. claims that a product or service are effective for their intended use; and "nutrient content and health claims", i.e. claims that a food provides a health or nutritional benefit.

The network 106 may comprise the Internet, a local area network, a peer to peer network, and so forth. Alternatively, the claims engine 104 may access the electronic text locally, such as from a storage medium located on the same computer on which the claims engine 104 resides.

The users 102 may access the claims engine 104 directly or via the network 106, as discussed herein. The claims engine 104 may communicate with claims storage 108. The users 102 may also communicate with claims storage 108 directly or via a network 106. The claims storage 108 may comprise more than one storage medium, claims databases, and so forth, according to exemplary embodiments. The users 102 may perform a search of the claims storage 108 via the claims engine 104, such as by querying the claims engine 104 for specific claims. Alternatively, the users 102 may perform a search of the claims storage 108 directly. The query may be based on attributes associated with the claims, for example. The claims identified by the claims engine 104 may be analyzed and presented to the users 102 in any manner. Analysis and presentation of the claims is discussed further in connection with FIGS. 3 through 6.

According to some embodiments, data mining and rules-based algorithms may be employed. A plurality of external standards may be incorporated as a reference for assessment or evaluation of the claims and associated attribute values, discussed herein. Queries comprising a plurality of attribute values, and a succession of such queries may be used to target and narrow results. Results may be displayed on a plurality of display devices.

FIG. 2 is a block diagram of an exemplary environment for utilizing identified claims to support user applications. One or more information sources 202, such as 202A through 202N, associated with the electronic text may be accessed directly or via the network 106, as discussed in FIG. 1. The information sources 202 may include but are not limited to Web sites, RSS feeds, email, electronic text transcripts of television or radio, electronic text derived from audio recordings or voice communications via voice-to-text technology, electronic text derived from documents through optical character recognition technology (OCR), electronic text derived from images, graphics, video or streaming video, and the like.

The electronic text may originate from various information sources 202 and may derive from various kinds of documents or media, such as press releases, product labels, product information and specification sheets, marketing literature, advertisements, articles, blogs, movies, songs or other forms of unstructured text. Further, the electronic text may be received through a plurality of media channels, such as the Internet, television, radio, RSS feeds, newspapers, magazines, blogs, email, and so forth, or physically received on storage medium such as compact disc. The volume of electronic text analyzed may be small, as in a single document, or very large, such as the Internet. The analysis may be an isolated instance, or be continuous or recurring. Various and multiple natural language and linguistic processing techniques, such as information extraction, may be utilized by the claims engine 104. Various and multiple key attributes associated with the claims identified by the claims engine 104 may also be extracted.

The claims engine 104 may identify claims from the electronic text, and may store the claims in claims storage 108, in a database associated with the claims storage 108 discussed in FIG. 1, or any other type of storage. Further, any mechanism for organizing the information associated with a storage medium may be utilized. As discussed herein, more than one database or other storage mediums may be utilized to store the linguistic content, the linguistic structures, and/or the identified claims. For example, a distributed storage system may be utilized for storing and accessing the identified claims and associated linguistic content and linguistic structures.

A user application 204 may communicate with the claims storage 108 and/or with the claims engine 104. Various user applications 204 may be in communication with the claims storage 108. Each application may utilize the claims stored in the claims storage 108. The user application 204 may include, but are not limited to: a shopping application, which may utilize the claims to direct potential purchasers to suitable products or services, or push products and services to targeted potential buyers; an advertising application, which may utilize the claims to direct an advertisement to targeted recipients; a buyer-seller matching application, which may utilize the claims to match appropriate buyers and sellers in ecommerce or electronic auctions; a compliance application, which may utilize the claims to find and identify noncompliant or illegal advertising or marketing practices; and a procurement application, which may utilize the claims to identify products and services meeting procurement specifications. One or more users 102 may interact with the user application 204 in order to utilize the claims for various purposes discussed herein, such as to locate products, perform analysis, and so forth. In alternative embodiments, the users may access the user application 204 via the claims engine 104.

Figure 3:
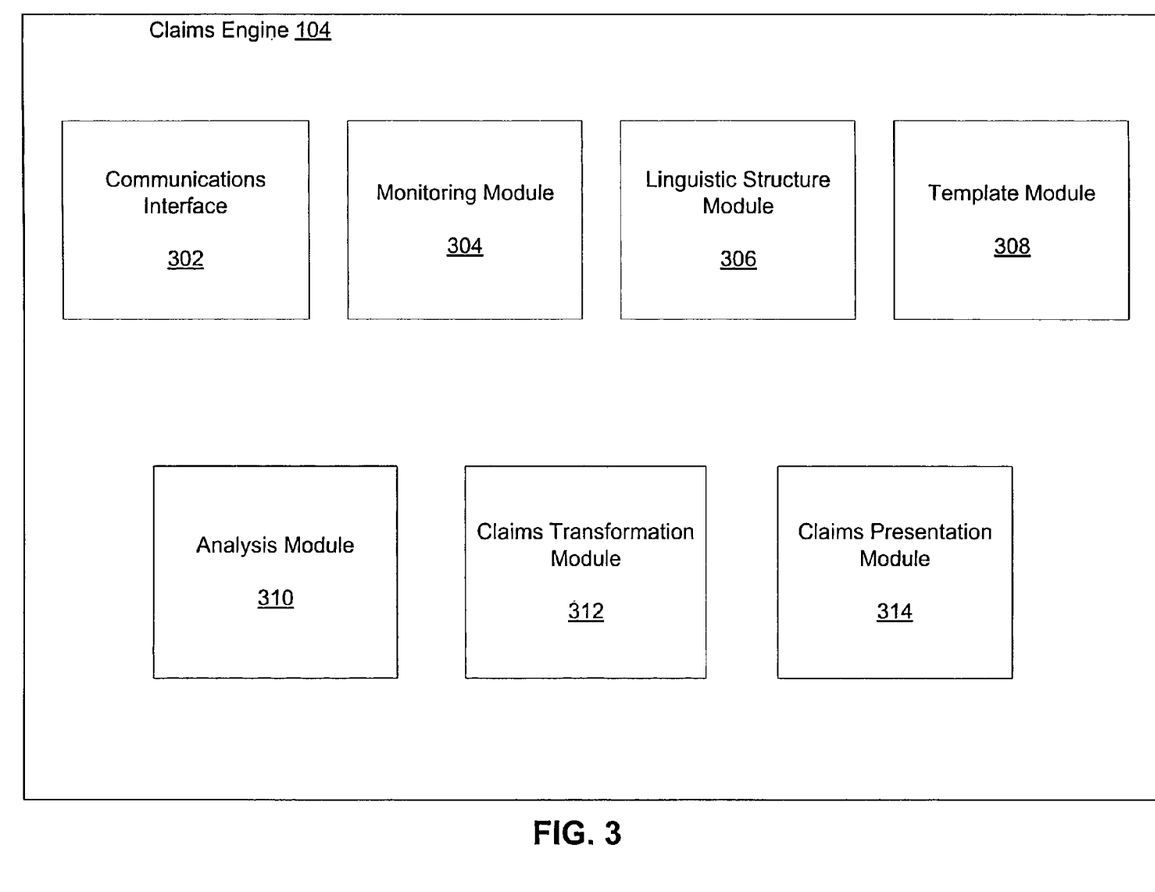
FIG. 3 shows an exemplary claims engine.

FIG. 3 shows a block diagram of an exemplary claims engine, such as the claims engine 104 discussed in FIG. 1. A communications interface 302 is provided for facilitating communication between the users 102 and the claims engine 104.

The claims engine 104 may also include a monitoring module 304. The monitoring module 304 accesses the electronic text, either via the network 106 or locally, such as by accessing the electronic text from the same device that comprises the monitoring module 304. The monitoring module 304 may search the network 106, storage, databases, the information sources 202 discussed in FIG. 2, and so forth in order to access the electronic text. The monitoring module 304 may include a scheduler for specifying times, increments of times, and so forth for the monitoring of the electronic text to be performed. Accordingly, claims in the electronic text may be identified during the monitoring or after the monitoring.

According to some embodiments, the monitoring schedule may be different for different sources of electronic text. For example, websites that tend to include a large number of claims may be monitored more frequently. Conversely, sources of claims determined to be consistent with regulatory standards associated with claims may be monitored less frequently. The monitoring module 304 may utilize various information discovery tools including searching, sorting, organizing, and browsing by full text or fields (attributes).

A linguistic structure module 306 identifies linguistic content associated with the electronic text. For example, identifying linguistic content may comprise identifying one or more linguistic features in the text and identifying one or more relationships between linguistic features. Identifying linguistic features may comprise, but is not limited to: tokenizing electronic text into segments of text, for example, identifying words, punctuation, white space, capital and lower case letters, sentences and so forth; identifying words for their part of speech, such as nouns, verbs, adjective, adverbs, and so forth; identifying groups of words, such as noun phrases, verb phrases, and prepositional phrases; and identifying entities, such as people, places, and things, such as in a health-related domain, identifying specific diseases. Other characteristics of the electronic text may be identified as linguistic features, and thus may be part of the linguistic content. Identifying relationships between linguistic features may comprise, but is not limited to: identifying subjects, predicates and objects of sentences and therefore identifying subject-predicate relationships, predicate-object relationships, and subject-predicate-object relationships, for example; identifying semantic roles of the sentence parts and therefore semantic relationships between the sentence parts; and identifying relationships implicit in phrases, for example in noun phrases. Other relationships may be implied in the electronic text, such as by virtue of contiguous text or co-occurrence. Other types of relationships identified may include, but are not limited to, grammatical, co-referring, semantic, and discourse relationships. A linguistic structure is generated based on the linguistic content identified by the linguistic structure module 306. A linguistic structure is any combination of two or more linguistic features and at least one relationship between the two features. A given piece of electronic text may yield one or more linguistic structures. Linguistic structures may be stored in a linguistic database in the linguistic structure module, in the claims storage 108, or in any other storage. Linguistic structures may be indexed in the claims storage 108 or any other storage to enable rapid and efficient retrieval.

The linguistic structure module 306 may also comprise information extraction agents that extract other information associated with the claim from the electronic text. Such other information may include, but is not limited to names of people, places, organizations and companies, times, dates, locations, addresses, amounts of currency, web addresses (urls), phone numbers, email addresses, and so forth. For example, a company name or a person's name may be extracted, even though a company name or a person's name does not constitute a claim. Other information may be stored with the claims.

A template module 308 includes one or more claim templates, such as structured claim templates or statistical claim templates. Statistical claim templates may comprise statistical models associated with claims and/or text examples. For example, in looking for "health benefit claims" of interest to the FDA, an example structured claim template for "health benefit claim" may be defined as a set of criteria containing: 1. presence of a "change verb", defined as any verb appearing in WordNet that is a hyponym of the verb "change" (an external reference), and 2. presence of a "disease term" defined as any term appearing as a node in the Diseases branch in the Medical Subject Headings tree (MeSH, also an external reference), and 3. presence of a predicate-object relationship between the "change verb" and the "disease term" in which the "disease term" is the syntactic object of the "change verb." Statistical claim templates may include statistical models of linguistic features associated with claims and/or text examples. Various linguistic forms exist for claims. The template module 308 may generate or access a template for each form. Templates may be stored in a query database contained in the template module, in the claims storage 108, or in any other storage. The templates may be utilized to identify claims from the electronic text based on the linguistic content.

The claims engine 104 may include an analysis module 310. The analysis module 310 may analyze the claims identified by the claims engine 104. The analysis may be utilized to recognize trends, patterns, outliers, correlations, relevance, similarity, and other attributes, such as whether a particular claim is likely to be false, misleading, or illegal. The analysis module may utilize external standards or information to evaluate claims, such as FDA-approved labels and product information sheets to identify an "off-label" claim.

The analysis module 310 may include data mining agents for automatically analyzing claims. The data mining agents may consist of a series of software algorithms that query the claims storage 108, retrieve lists or records, perform some analysis (such as statistical, pattern matching, further NLP, etc.) Accordingly, the monitoring module 304 and the analysis module 310 may be utilized to perform a partially or completely automated claims analysis system, such as by performing an automated search and identification of the electronic text and the identification and analysis of the claims identified associated with the electronic text. The analysis module 310 may utilize the data mining agents to generate reports for further analysis, or the analysis module 310 may augment records of the claims by storing information to the claims storage 108.

A claims transformation module 312 may also be provided for modifying the claims. The claims may be modified in accordance with regulatory standards, such as regulations set forth by the Food and Drug Administration ("FDA") or Federal Elections Commission. Alternatively, the claims transformation module 312 may suggest modifications to the claims detected in the electronic media, for example, to a provider of the electronic media, such as a website sponsor that displays the electronic media including the claims. The monitoring module 304 may monitor the electronic media specifically for claims that should have been modified based on suggestions, for example, from a government body or other authority.

A claims presentation module 314 may display the claims to users, such as analysts, shoppers, procurement professionals, regulators, strategists, communications specialists, researchers, and so forth. The display may be in response to a query for types of claims, for example. Any type of presentation may be provided by the claims presentation module 314. According to some embodiments, claim alerts based on user specified criteria can be setup and accessed via a web interface or pushed via email message. For example, a campaign manager may be alerted to the dissemination of a political claim made by an opponent.

Figure 5:
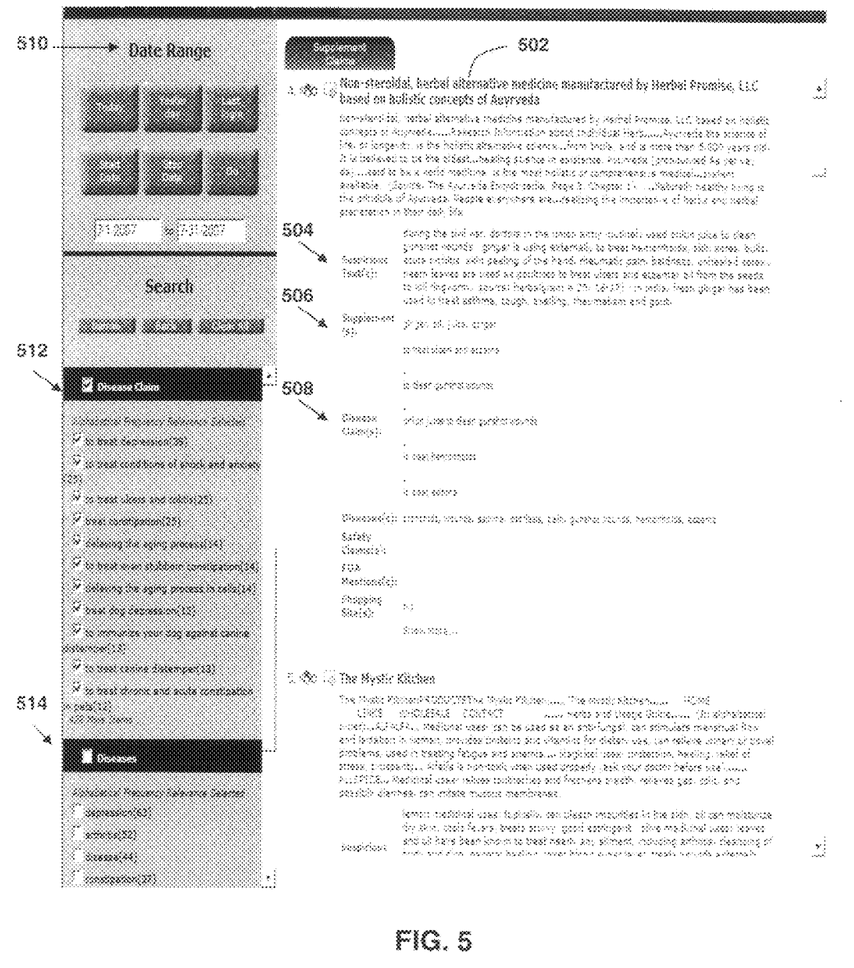
FIG. 5 shows a screen shot illustrating exemplary claims identification from electronic text.

The results to a query may be displayed in a variety of ways. For example, a results set may be presented as a list of claims meeting the query. For each claim, a summary of each of the claims and the associated information may be generated. There may be links from the summary to a cached copy of the text, in which claims are highlighted for easier examination. Highlighted claims are shown in FIG. 5, discussed herein. There may also be links from the summary to original text.

Although various modules are shown in FIG. 3, fewer or more modules may comprise the claims engine 104 and still fall within the scope of various embodiments. For example, a claims indexer (not shown) may also comprise the claims engine 104 according to some embodiments.

Figure 4:
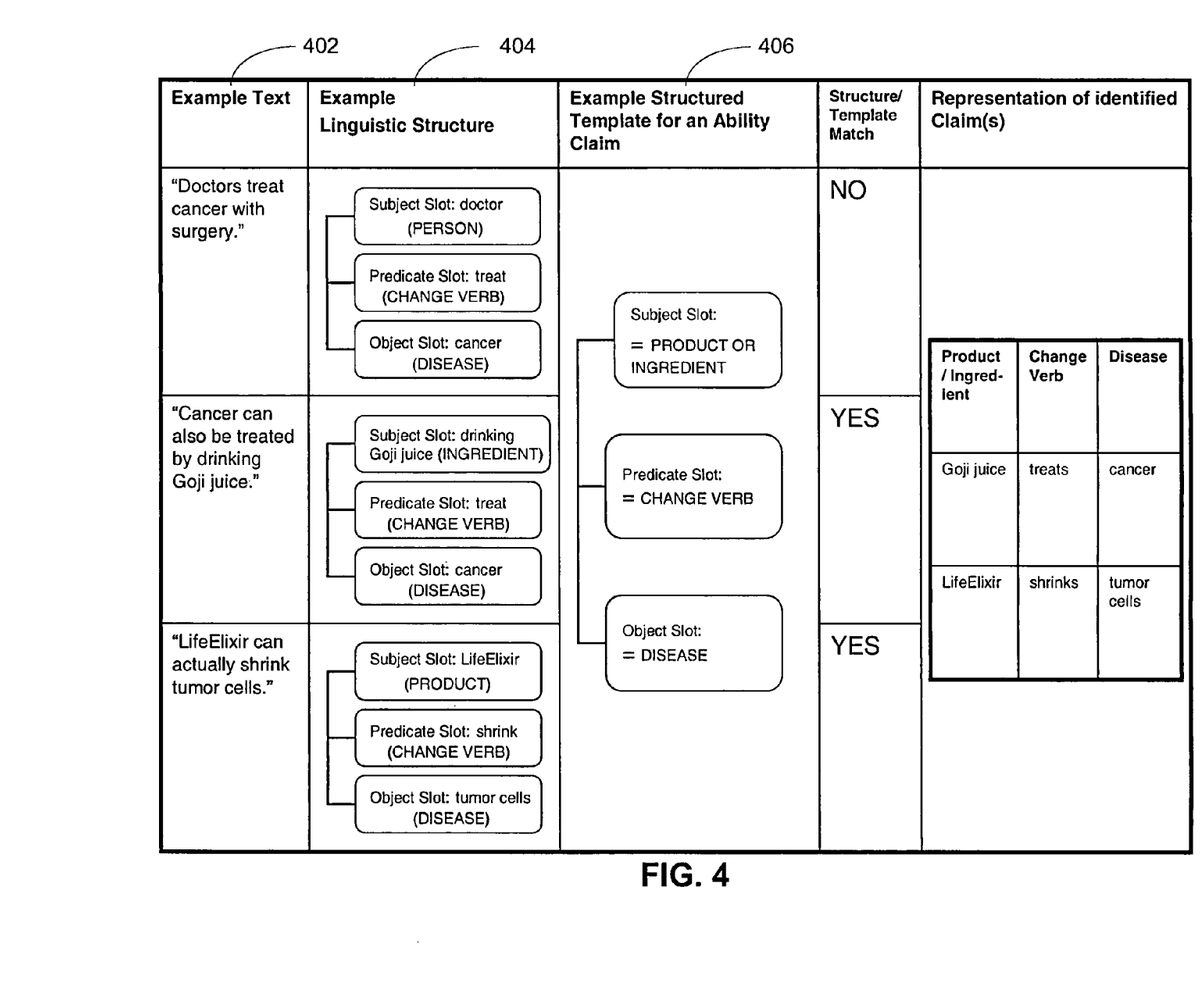
FIG. 4 is a diagram illustrating an exemplary representation of an identified claim.

FIG. 4 is a chart illustrating an exemplary representation of an identified claim. An example claim template is a structured claim template for an ability claim. Claim templates may be of other types, such as a statistical claim template, and may be for claims of a different type, such as an identity claim.

Example text 402 comprises the electronic text discussed herein. Although the electronic text may include more than the example text 402 shown in FIG. 4, the example text 402 represents language that may be identified as potential claim language by the claims engine 104.

The example text 402 is utilized to generate example linguistic structures 404. The example linguistic structures 404 may include linguistic features such as parts of speech and identified entities such as ingredients, products and diseases, and may include relationships between linguistic features such as subject-predicate-object relations, and so forth.

The example linguistic structures 404 are then compared to an example claim template, such as a structured claim template for an ability claim 406, to identify the claims. As discussed herein, the linguistic structures 404 may alternatively be statistically analyzed for a match with a statistical claim template based on a training set of text examples. Based on the comparison, the claim may be identified. For example, if the linguistic structures 404 match the ability claim template 406 in FIG. 4, the example text 402, or a portion thereof, may be identified as a claim. According to some embodiments, claim language may then be extracted from the electronic text and may be stored. The linguistic structures 404 and/or the claim templates may also be stored.

In FIG. 4, each example text 402 is comprised of a sentence with a subject, predicate and object. The resulting example linguistic structures 404 generated thus each contain a subject, predicate and object. Each example of the linguistic structures 404 is then compared to the example structured claim template 406. The example claim template 406 contains a subject slot, a predicate slot and an object slot. The slots are related in a subject-predicate-object relationship. The claim template 406 further defines that the subject slot contain a product or ingredient, that the predicate slot contain a "change verb", i.e. a term that appears in WordNet (an external reference), as a hyponym for the verb "change", and that the object slot contain a "disease term" defined as a node in the Disease branch of the Medical Subject Headings tree (MeSH, a second external reference). In FIG. 4, the example text 402 including the text "Doctors treat cancer with surgery" is not identified as a claim because while a subject-predicate-object relationship is present, and the specific predicate and object meet the criteria set forth in the example claim template 406, the subject is identified as a person, not a product or ingredient as required by the template.

The text example containing the text "Cancer can also be treated by drinking Goji Juice" is identified as a claim because the text has a subject, predicate and object, all in a subject-predicate-object relationship, and the subject contains a term identified as an ingredient, the predicate contains a term that is a "change verb", i.e. a hyponym of the verb "change" in WordNet, and the object is a "disease term", i.e. a word found as a node in the MeSH Disease branch. A claim may therefore be extracted from the electronic text and may be represented, as in FIG. 4. The text example containing the text "Life Elixir can actually shrink tumor cells" is also identified as a claim, and may be extracted, because it too meets all criteria of the example claim template 406. Other linguistic templates may have more or less criteria and may have different criteria, based upon various and different linguistic content, and may be of various types, such as an "identity claim template." The linguistic structures 404 may or may not match other claim templates according to greater or fewer criteria, different criteria, and different template types.

As discussed herein, various other claim templates may be utilized to identify claims, such as identity, attribute, attribution, and superiority claim templates. Examples of other templates include an identity claim template that corresponds to the claim form "Gogi Juice is a cancer-killer," an attribute claim template that corresponds to the claim form "Gogi Juice has cancer-killing properties," an attribution claim template that corresponds to the claim form "4 out of 5 doctors recommend Gogi Juice for cancer", and a superiority claim template that corresponds to the claim form "Goji Juice is better than chemotherapy for treating cancer." As discussed herein, any claim templates, such as structured templates or statistical templates may be employed for comparison with the linguistic structures 404 and identification of the claims.

As discussed herein, the claims identified based on the comparison between linguistic structures and claim templates may occur due to a statistical probability instead of a match. For example, a claim may be identified because the criteria set forth in a statistical claim template has a 75% chance of being satisfied by one or more of the linguistic structures.

As discussed herein, the claims identified based on the comparison between the linguistic structures and the claim templates may be stored in the claims storage 108 for later analysis or access. According to some embodiments, any user may access the claims for evidence, support, research, or for any other reason.

FIG. 5 shows a screen shot illustrating exemplary claims identification from electronic text. A portion of electronic text 502, representative of a larger body of electronic media associated with "Herbal Promise, LLC" is shown in FIG. 5. The claims engine 104 identifies disease-related claims 508 from the electronic media, based on comparison of generated linguistic structures to a claim template, such as a structured claim template or a statistical claim template, as discussed herein in connection with FIG. 4. Strings of suspicious text 504 containing claims are also displayed. Additional information associated with the identified claims may also be displayed. For example, supplements and other ingredients 506 may be extracted and displayed. The company offering the product or service, and its contact information, may also be extracted and displayed. According to some embodiments, the source of the text, for example a URL (if a website is the source) may be displayed. This additional information may also be stored in the claims storage 108 or in other storage.

The claims identified along with other related information may be stored in the claims storage 108, which may then be searched, as shown in FIG. 5. The search may be based on a date range 510, by checking a disease claim search boxes 512, and/or disease types boxes 514. Any other type of search parameters may be provided in addition to or instead of the search parameters (e.g., the date range 510, the disease claims search box 512, and the disease types boxes 514) shown in FIG. 5.

Figure 6:
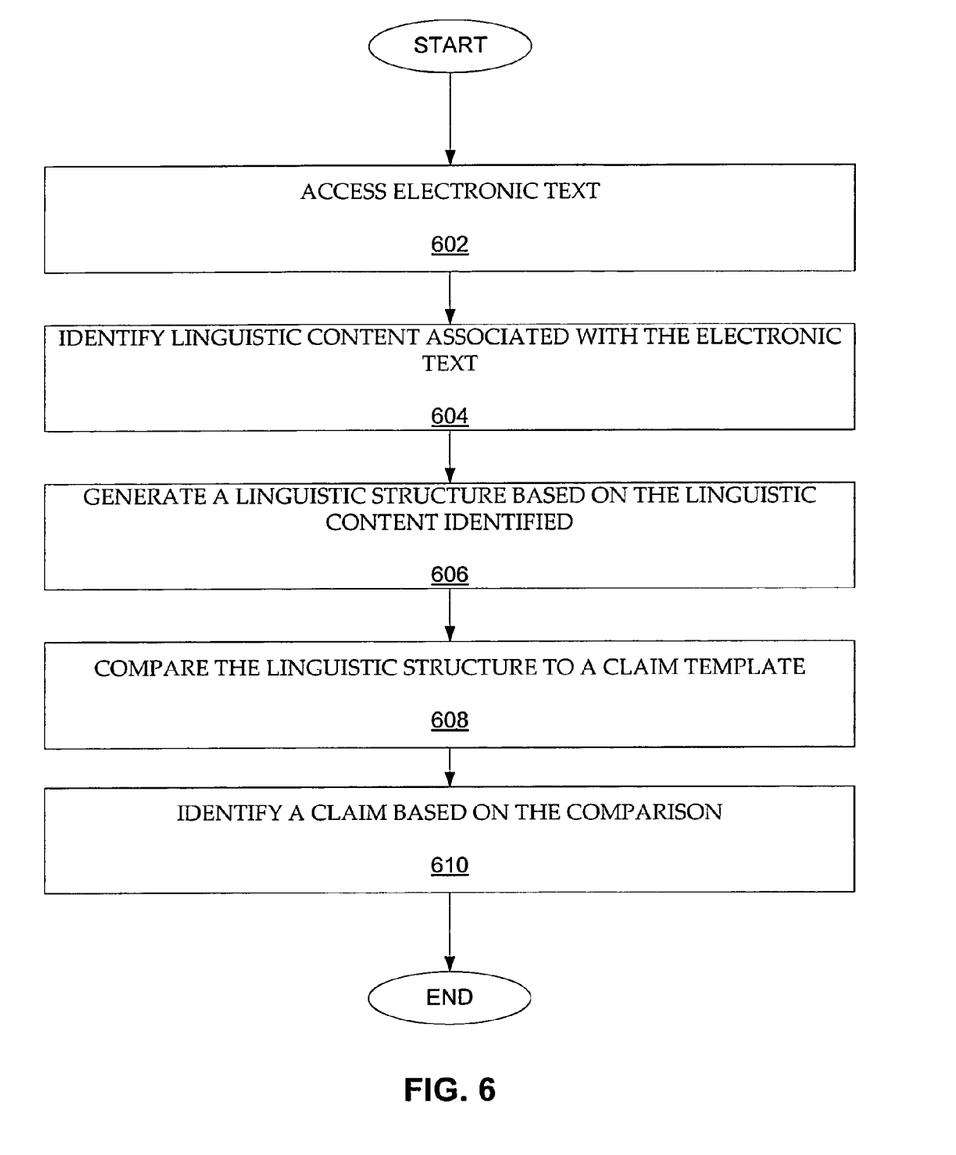
FIG. 6 is a flow diagram of an exemplary process for identifying claims associated with electronic text.

FIG. 6 shows a flow diagram of an exemplary process for identifying claims associated with electronic text. At step 602, electronic text is accessed. The access may occur by various means, such as monitoring the electronic text via a network, such as a wide area network, a local area network, a peer to peer network, and so forth. Alternatively, the electronic text may be accessed directly on a client device or directly from the information sources 202 discussed in FIG. 2. As discussed in FIG. 3, the monitoring module 304 may be provided for scheduling monitoring according to user specified time increments or any other schedule. As also discussed herein, any information sources 202 may be utilized to derive the electronic text.

At step 604, linguistic content associated with the electronic text is identified. For example, linguistic features may be identified by: breaking down or tokenizing the electronic text into words, sentences, punctuation, white spaces, and so forth; identifying words for their part of speech, such as nouns, verbs, adjectives, adverbs, and so forth; identifying word groups constituting phrases, identifying entities, such as places, people, companies, times, products, and so forth.

Using semantic role labeling, or other techniques, the words, phrases, and/or entities may be labeled as sentence parts (e.g., subject, object, predicate), thereby identifying linguistic roles that the words, phrases, and/or entities play and the linguistic relationships between them, thus further identifying linguistic content. Identified relationships may include those that are implied, for instance by co-occurrence. For example, the herbal medicine electronic media 502 shown in FIG. 5 may be broken down, parts of speech identified, phrases identified, entities identified, such as product type, disease type, ingredients, and so forth, and linguistic roles and relationships of the words, phrases, and other parts identified, such as subject-predicate relations and verb-object relations.

According to some embodiments, natural language processing is utilized to process the electronic text, such as by converting file formats and character encoding schemes, part-of-speech tagging, syntactic parsing, information extraction, automated text categorization, word sense disambiguation, text segmentation, relationship mining, event detection, toponym resolution, and creation and management of taxonomies, lexicons, and knowledge bases.

At step 606, a linguistic structure based on the linguistic content identified is generated, such as the exemplary linguistic structure 404 shown in FIG. 4. The linguistic structures may be comprised of linguistic features such as words, phrases and text strings (including entities) identified as parts of speech, together with relationships of the features, such as subject-verb-object relationships. In some embodiments, relationships are implied by identification of linguistic roles. All linguistic features and relationships may constitute linguistic content. The linguistic structures may also be utilized to represent a collection of concepts that are expressed in the electronic text, for example.

At step 608, the linguistic structures are compared with a claim template. The claim template may comprise a structured claim template, such as the ability claim template discussed in FIG. 4. For example, the template module 308 may utilize the template for "health benefit claim" discussed in connection with FIG. 3. As discussed herein, statistical templates may alternatively be utilized as claim templates.

At step 610, a claim is identified based on the comparison. For example, the electronic text giving rise to linguistic structures that match the predetermined claim template, such as the structured claim template or the statistical claim template discussed herein, may be deemed claims. The electronic text giving rise to linguistic structures that meet pre-set threshold probability criteria set forth by a statistical template may also be identified as one or more claims.

As discussed herein, the claims may also be stored for future access. The claims may be stored in the claims storage 108 discussed in FIG. 1, in a database, or on any storage medium. Storing and retrieving information may also be accomplished via full text search engines and database management systems, according to some embodiments. According to exemplary embodiments, the claims may be accessed via the claims storage 108 and automatically analyzed and presented to a user. For example, data mining agents may run analysis whenever new data is added or on a scheduled basis. For example, the user may recognize noncompliant product information, deceptive ads or other illegal practices, and so forth using the automatic analysis of the claims. Identified claims may be analyzed for a wide variety of other purposes, such as in shopping applications. For instance the claim "starts in cold weather" identified with reference to a specific product may enable a buyer to identify a suitable product.

After the claims and/or other associated information, such as the additional information 506 shown in FIG. 5, is identified, data mining and rules-based algorithms may be applied to analyze patterns, trends, outliers, correlations, relevance, similarity, comparison to standards, and other characteristics: Such additional analysis may also be displayed along with the relevant claim(s). For example, claims categorized as health benefit claims may be analyzed for their likelihood to be potentially violative (illegal) under Food and Drug law. Such potentially violative claims may be presented as a ranked list according to likelihood of violative content.

The identified claims, as well as other information associated with the claims, may be presented using natural language generation tools, text summarization, or information visualization systems, for example. As discussed herein, any type of presentation of the claims identified by the claims engine 104 may be utilized.

According to some embodiments, the claims identified by the claims engine 104 may be automatically "red-flagged." For example, instances in which claims have a high likelihood of violating the law may be red-flagged, e.g. supplement claims about diagnosis, cure, mitigation, treatment and prevention of disease. Further, the monitoring module 304 may automatically conduct "follow-up" monitoring to verify that offending companies associated with the detected claims have complied with FDA requests or orders for corrective action, such as modifications to the claims, as discussed herein.

Figure 7:
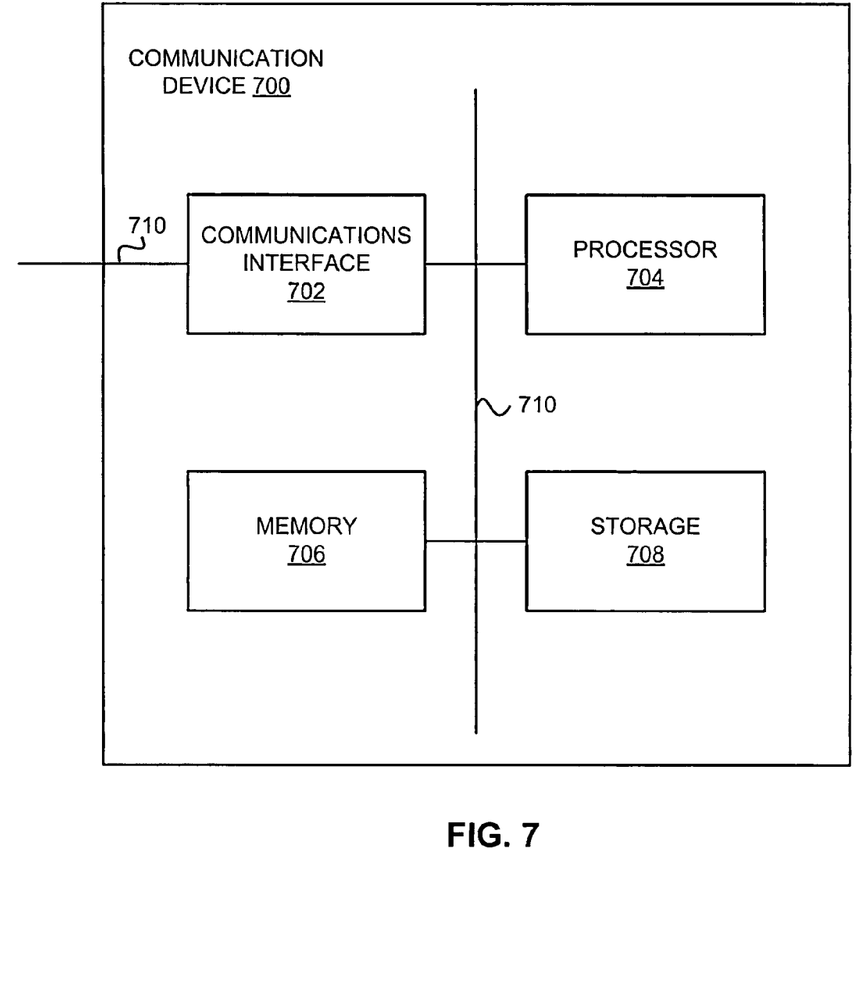
FIG. 7 shows an exemplary computing device.

FIG. 7 shows an exemplary computing device. The computing device may comprise the claims engine 104 or computing devices associated with the users 102 according to some embodiments. The computing device includes a communications interface 702, a processor 704, a memory 706, and storage 708, which are all coupled to the bus 710. The bus 710 provides communications between the communications interface 702, the processor 704, the memory 706, and the storage 708.

The processor 704 executes instructions. The memory 706 permanently or temporarily stores data. Some examples of the memory 706 are RAM and ROM. The storage 708 also permanently or temporarily stores data. Some examples of the storage 708 are hard disks and disk drives.

The embodiments discussed herein are illustrative. As these embodiments are described with reference to illustrations, various modifications or adaptations of the methods and/or specific structures described may become apparent to those skilled in the art.

The above-described components and functions can be comprised of instructions that are stored on a computer-readable storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with the invention. Those skilled in the art are familiar with instructions, processor(s), and storage medium.

While various embodiments have been described above, it should be understood that they have been presented by way of example only, and not limitation. For example, any of the elements associated with the claims engine 104 may employ any of the desired functionality set forth hereinabove. Thus, the breadth and scope of a preferred embodiment should not be limited by any of the above-described exemplary embodiments.

What is claimed is:

1. A method for identifying claims associated with electronic text comprising:
   accessing electronic text;
   identifying linguistic content associated with the electronic text wherein the linguistic content includes a plurality of linguistic features;
   generating a linguistic structure based on the linguistic content identified, wherein the linguistic structure identifies at least a relationship between a first two or more linguistic features of the plurality of linguistic features;
   comparing the linguistic structure to a claim template, wherein the claim template identifies the same relationship between a second two or more linguistic features, each of the second two or more linguistic features corresponding to a linguistic feature of the first two or more linguistic features;
   in response to a determination that each of the first two or more linguistic features is a hyponym of the corresponding linguistic feature in the second two or more linguistic features, identifying a claim within the electronic text.

2. The method recited in claim 1, wherein the electronic text comprises electronic media.

3. The method recited in claim 1, further comprising extracting the identified claim.

4. The method recited in claim 1, further comprising storing the identified claim.

5. The method recited in claim 4, further comprising allowing a user to perform a search of the stored claim.

6. The method of claim 1, further comprising storing the linguistic structure.

7. The method of claim 1, further comprising indexing the linguistic structure.

8. The method recited in claim 1, wherein the claim template comprises a structured claim template.

9. The method recited in claim 1, wherein the claim template comprises a statistical claim template.

10. The method recited in claim 1, wherein identifying linguistic content associated with the electronic text comprises identifying at least one entity.

11. The method recited in claim 1, further comprising monitoring an information source for the electronic text.

12. The method recited in claim 1, further comprising determining a likelihood of regulatory compliance of the identified claim.

13. A system for identifying claims associated with electronic text comprising:
- one or more processors;
- a monitoring module configured to access electronic text;
- a linguistic structure module configured to identify linguistic content associated with the electronic text and generate a linguistic structure based on the linguistic content identified, wherein the linguistic content includes a plurality of linguistic features and the linguistic structure identifies at least a relationship between a first two or more linguistic features of the plurality of linguistic features;
- a template module configured to compare the linguistic structure to a claim template and to identify a claim within the electronic text based on the comparison,
    - wherein the claim template identifies the same relationship between a second two or more linguistic features, each of the second two or more linguistic features corresponding to a linguistic feature of the first two or more linguistic features;
    - wherein the comparison is performed by determining whether each of the first one or more linguistic features is a hyponym of the corresponding linguistic feature in the second one or more linguistic features.

14. The system recited in claim 13, wherein the electronic text comprises electronic media.

15. The system recited in claim 13, wherein the template module is further configured to extract the claim from the electronic text.

16. The system recited in claim 13, further comprising claims storage configured to store the claim.

17. The system recited in claim 16, wherein the claims storage is further configured to allow a user to perform a search of the stored claim.

18. The system of claim 16, wherein the claims storage is further configured to store the linguistic structure.

19. The system of claim 16, wherein the claims storage is further configured to index the linguistic structure.

20. The system recited in claim 13, wherein the claim template comprises a structured claim template.

21. The system recited in claim 13, wherein the at least one claim template comprises a statistical claim template.

22. The system recited in claim 13, wherein the linguistic structure module is further configured to identify at least one entity.

23. The system recited in claim 13, further comprising an analysis module configured to determine a likelihood of regulatory compliance of the identified claim.

24. A computer program embodied on a non-transitory computer readable medium, the computer program being executable by a processor for identifying claims associated with electronic text, the method comprising:
- accessing electronic text;
- identifying linguistic content associated with the electronic text, wherein the linguistic content includes a plurality of linguistic features;
- generating a linguistic structure based on the linguistic content identified, wherein the linguistic structure identifies at least a relationship between a first two or more linguistic features of the plurality of linguistic features;
- comparing the linguistic structure to a claim template, wherein the claim template identifies the same relationship between a second two or more linguistic features, each of the second two or more linguistic features corresponding to a linguistic feature of the first two or more linguistic features;
- in response to a determination that each of the first two or more linguistic features is a hyponym of the corresponding linguistic feature in the second two or more linguistic features, identifying a claim within the electronic text.

25. The computer program recited in claim 24, wherein the electronic text comprises electronic media.

26. The computer program recited in claim 24, further comprising extracting the identified claims.

27. The computer program recited in claim 24, further comprising storing the identified claim.

28. The computer program recited in claim 27, further comprising allowing a user to perform a search of the stored claim.

29. The computer program of claim 24, further comprising storing the linguistic structure.

30. The computer program of claim 24, further comprising indexing the linguistic structure.

31. The computer program recited in claim 24, wherein the claim template comprises a structured claim template.

32. The computer program recited in claim 24, wherein the at least one claim template comprises a statistical claim template.

33. The computer program recited in claim 24, wherein identifying linguistic content associated with the electronic text comprises identifying at least one entity.

34. The computer program recited in claim 24, further comprising monitoring an information source for the electronic text.

35. The computer program cited in claim 24, further comprising determining a likelihood of regulatory compliance of the identified claim.

* * * * *